US006009926A

United States Patent [19]

Vicktorius et al.

[11] Patent Number: 6,009,926

[45] Date of Patent: Jan. 4, 2000

[54] DEVICE FOR ATTACHING ADHESIVE LABELS TO PACKAGED GOODS

[75] Inventors: Winfried Vicktorius; Ralf Dippe, both of Duisburg, Germany

[73] Assignee: Espera-Werke GmbH, Germany

[21] Appl. No.: 09/029,220

[22] PCT Filed: Aug. 23, 1996

[86] PCT No.: PCT/DE96/01560

§ 371 Date: Feb. 25, 1998

§ 102(e) Date: Feb. 25, 1998

[87] PCT Pub. No.: WO97/08055

PCT Pub. Date: Mar. 6, 1997

[30] Foreign Application Priority Data

Aug. 26, 1995 [DE] Germany ........................... 195 31 426

[51] Int. Cl.[7] .............................. B32B 31/00; B65C 9/26; B65C 9/08

[52] U.S. Cl. .......................... 156/556; 156/566; 156/542; 156/DIG. 37; 156/DIG. 28

[58] Field of Search .................................... 156/540, 541, 156/542, 556, 566, DIG. 24, DIG. 32, DIG. 28, DIG. 37, DIG. 45

[56] References Cited

U.S. PATENT DOCUMENTS

| | | | |
|---|---|---|---|
| 4,124,436 | 11/1978 | Pettis, Jr. et al. . | |
| 4,255,220 | 3/1981 | Kucheck et al. | 156/285 |
| 4,475,978 | 10/1984 | Bartl | 156/497 |
| 4,595,447 | 6/1986 | Lindstrom | 156/364 |
| 5,750,004 | 5/1998 | Wurz et al. | 156/360 |

FOREIGN PATENT DOCUMENTS

| | | |
|---|---|---|
| 0090631 | 10/1983 | European Pat. Off. . |
| 0124803 | 11/1984 | European Pat. Off. . |
| 9107898 | 9/1991 | Germany . |

*Primary Examiner*—Richard Crispino
*Assistant Examiner*—Sue A. Purvis
*Attorney, Agent, or Firm*—Robert W. Becker & Associates

[57] ABSTRACT

A device for attaching adhesive labels to packaged goods has a compressed air source and a vacuum source that are alternatingly connected by program-controlled two way valves to air inlet openings of a pneumatic cylinder. A main piston is connected to the upper end of a hollow piston rod and is guided between an upper and a lower dead center position in the pneumatic cylinder. The hollow piston rod has a lateral air opening within the cylinder. A suction holder is connected to a lower end of the hollow rod positioned external to the pneumatic cylinder. The suction holder has a suction channel axially connectable to the hollow piston rod and closeable partially by a check valve. A label transfer unit has a label transfer position in which a respective label is positioned at a small distance below the suction holder when in its upper position. A control device lowers the suction holder into the lower position for receiving the label. The control device has a control member that reciprocates vertically parallel to the pneumatic cylinder and cooperates with an abutment positioned external to the cylinder at the piston rod/suction holder. The main piston has a permanent magnet at its upper surface, and a counter magnet is positioned at the cylinder opposite the permanent magnet when the main piston is in its upper dead center position. A travel sensor is arranged external to the pneumatic cylinder for controlling the required stroke of the main piston.

4 Claims, 4 Drawing Sheets

DEVICE FOR ATTACHING ADHESIVE LABELS TO PACKAGED GOODS

BACKGROUND OF THE INVENTION

The invention relates to a device for attaching adhesive labels to packaged goods.

It is conventional to attach identifying labels to packaged goods which provide certain information in regard to the goods, especially weight, price etc. Such labels are printed in a printer with the respective information after weighing of the goods and are subsequently attached to the packaged goods whereby mainly so-called adhesive labels are used.

The attachment of the adhesive labels onto packaged goods must take into consideration that the packaged goods, which are preferably transported by continuously or intermittently operating transport devices, have often different size, respectively, height measurements so that complicated controls for actuation of the device are required whereby this is often made even more complicated because the packaged goods are so-called soft packages.

It must furthermore be taken into consideration that the adhesive labels in general are relatively thin foil elements that during their transport, respectively, during their transfer to the device for attaching the adhesive labels onto the packaged goods are not exactly aligned within a single plane but are often wavy so that often malfunctions occur during transfer of a label to the device for attaching it onto the packaged goods.

The invention therefore has as an object to design a device for attaching adhesive labels onto packaged goods such that, on the one hand, a safe transfer of a label to the device and, on the other hand, a reliable attachment of the label to the packaged goods is ensured.

SUMMARY OF THE INVENTION

As a solution to this object a device for attachment of adhesive labels onto packaged goods is inventively provided that comprises a pneumatic cylinder with two air inlets that can be alternatingly connected to a compressed air source and/or a vacuum source, in which a piston is guided between an upper and a lower dead center position, which piston is connected to the upper end of a hollow piston rod which, within the pneumatic cylinder, has a lateral air opening and at its lower end, external to the cylinder, is provided with a suction holder that comprises a suction channel connectable axially to the hollow piston rod, and closeable relative to the hollow piston rod by a check valve, and further comprises an adhesive label transfer device with which a respective label is transported into a label transfer position at a small distance below the suction holder that is in its upper dead center position, and further comprises a control device for lowering the suction holder into the label transfer position.

An important feature of the invention is that the individual label is first guided to the suction holder at a certain distance so that labels that are wavy to a certain extent can be transported into a label transfer position by the suction holder without impediment, and that the suction holder is lowered onto the label only after the label has reached this transfer position. In this lowered position the suction holder is then provided with vacuum in order to receive the individual label from the transfer unit which is then returned in order to receive a further label that has been printed by the printer.

Further features and advantages of the invention result from the dependent claims.

BRIEF DESCRIPTION OF THE DRAWINGS

The invention will be disclosed in more detail with the accompanying drawings.

DESCRIPTION OF PREFERRED EMBODIMENTS

Figure 1:
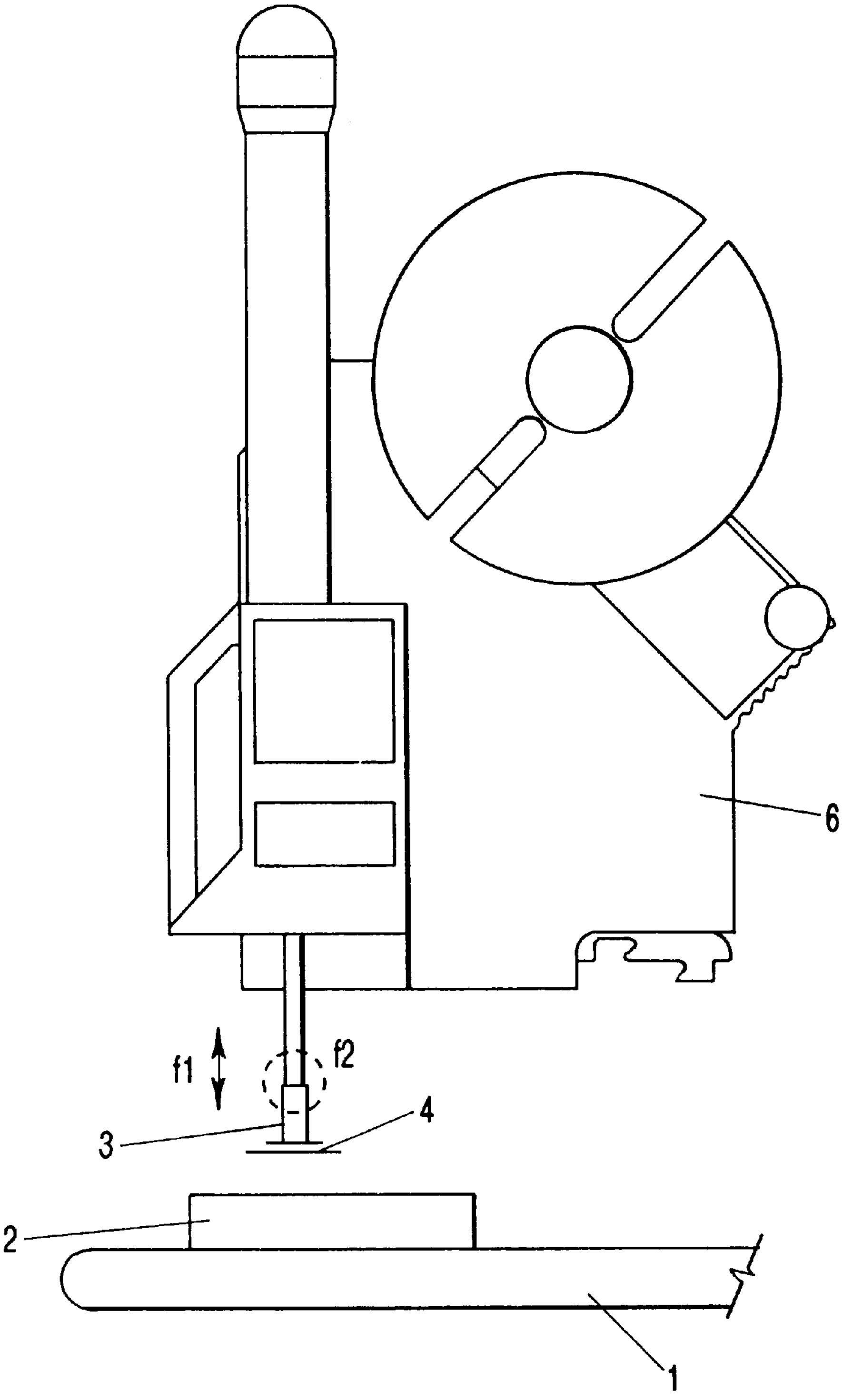
FIG. 1 shows a schematic representation of a side view of the inventive device with a printer arranged upstream and a transport device for supplying the packaged goods.
Figure 2:
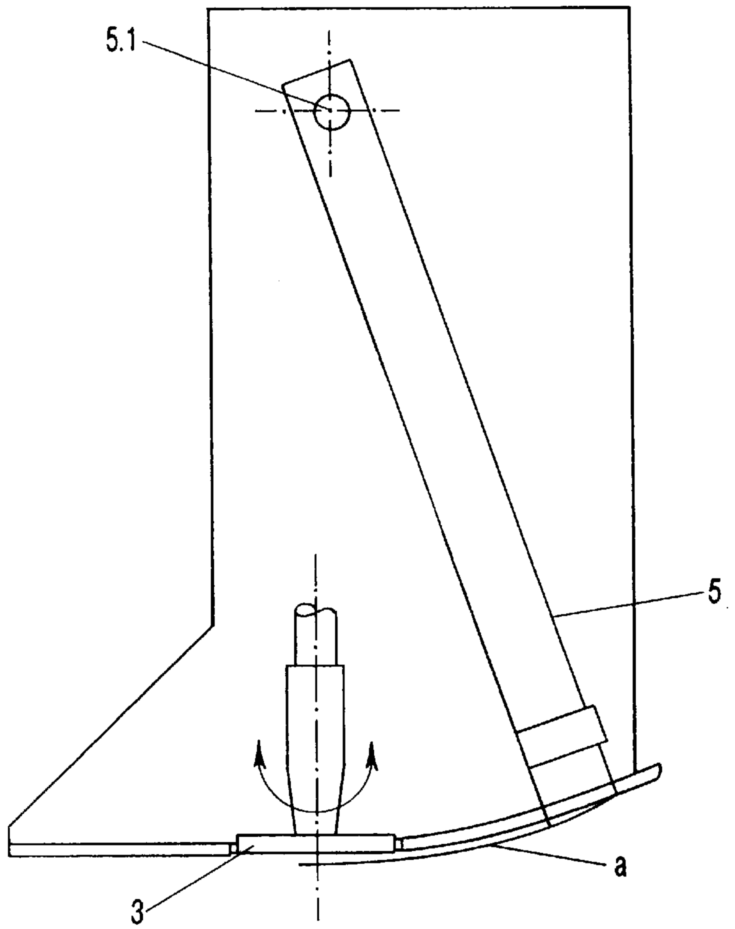
FIG. 2 shows a schematic representation of a side view of the transfer unit for transferring the printed labels to the inventive device.

The device for attaching adhesive labels onto packaged goods, schematically represented in FIG. 1, comprises a transport device 1 with which the individual packaged goods 2 are brought into a position below a suction holder 3 that linearly reciprocates in the direction of double arrows f1 and secures an individual adhesive label 4 by vacuum. This adhesive label 4, according to FIG. 2, is transferred by a transfer element in the form of a pivotable arm 5 that pivots about a horizontal axis 5.1. At its underside the arm is provided with vacuum openings in order to receive the adhesive label coming from a printer 6 arranged upstream and to transfer it to the suction holder 3.

Figure 3:
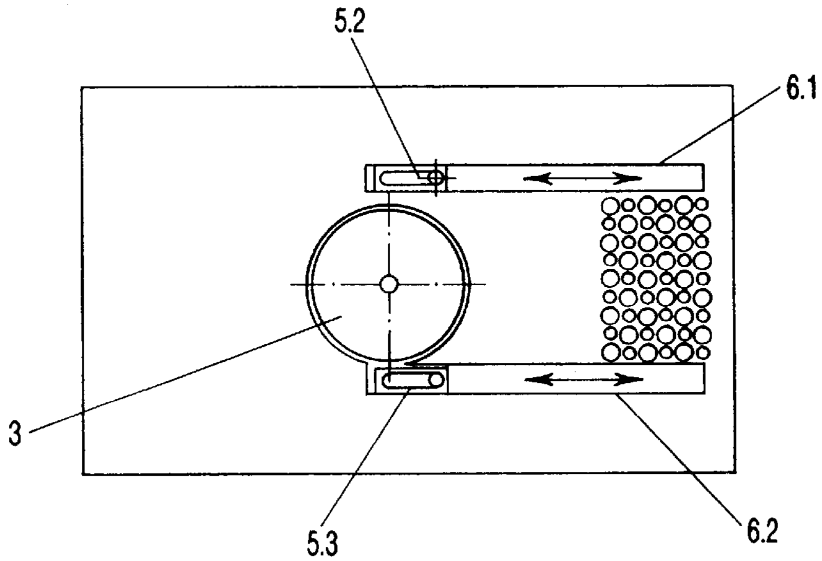
FIG. 3 shows a bottom view of the device shown in FIG. 2.

The transfer element 5 comprises according to FIG. 3 two suction arms 5.2 and 5.3 which are positioned at a lateral spacing from one another such that in a vertical projection they can accommodate the substantially circular suction holder 3 therebetween. The suction arms 5.2 and 5.3 of the transfer element 5 are guided in linear guides 6.1 and 6.2

FIG. 2 shows the suction holder 3 in its uppermost position. The pivot radii of the lower ends of the two suction arms 5.2 and 5.3 is selected such that their two lower ends in their position below the suction holder 3 have a vertical spacing indicated by the line a. This spacing serves to insure with utmost reliability that the individual adhesive labels 4 can be transferred unimpededly into a position below the suction holder 3.

The suction holder 3 is connected to the lower end of a hollow main piston rod 7 (FIG. 4) which at its upper end has a piston 9 that is sealingly guided in a pneumatic cylinder 8. A first air connector 10 opens into the cylinder 8 below the piston 9. A second air connector 11 opens above the piston 9 into the cylinder 8. The piston 9 is sealingly guided by glide rings 12 in the cylinder 8. A permanent magnet 13 is inserted into the upper end of the piston 9 which, in the upper piston position, is positioned opposite a ring 14 consisting of ferromagnetic material in order to secure the piston, and thus the piston rod and the holder, in the upper dead center, respectively, resting position even without support action by air.

A further piston rod portion 15 is connected to the upper end of the piston 9 which forms a part of the shock absorbing unit 16 operated especially pneumatically in order to dampen the piston rod/piston unit 7/9 especially for upward movement.

The hollow piston rod 7 is provided with a lateral air inlet opening 7.1. The suction holder 3 which is connected to the lower end of the hollow piston rod 7 has an axial bore 3.1 whereby between the lower end of the hollow piston rod 7 and the upper end of the axial bore 3.1 a check valve in the form of a ball 17 is located whose seating surface comprises a non-represented bypass opening so that, when the axial bore is closed by the ball, a minimum air compensation between the hollow space of the piston rod 7 and the axial bore 3.1 takes place.

Adjacent to the lower end of the cylinder 8 a lifting magnet 19 is arranged which is engaged by a return spring 18. This lifting magnet 19 is provided with an actuating rod 19.1 that is moveable in the vertical direction and to which is connected a horizontal actuating fork 19.2 that engages the lower end of the piston rod 7 and acts on a support ring 20 connected to the lower end of the piston rod.

Hall sensors 21 are arranged laterally at the cylinder tube 8 which serve as travel sensors for adjusting the stroke of the piston 9 to the different heights of the packaged goods and to control the travel stroke of the piston by controlling the air supply through the air connectors 11 and 10 above and below the piston 9.

Figure 4:
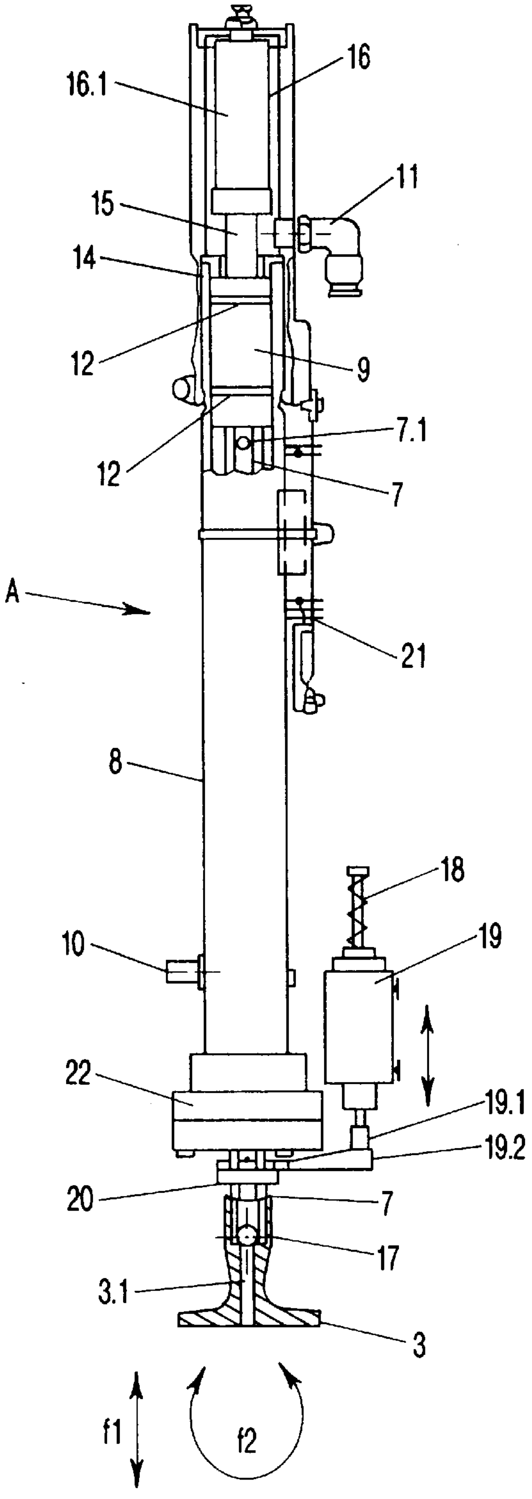
FIG. 4 shows, partly in section and partly in a side view, the inventive device.
Figure 5:
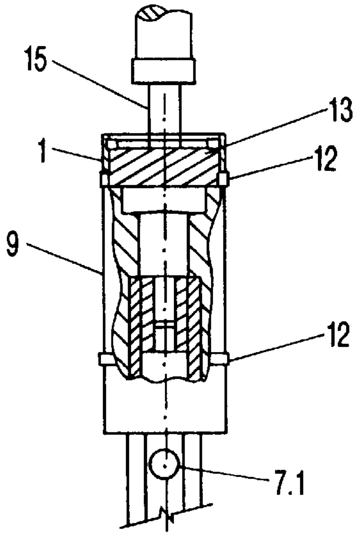
FIG. 5 shows, partly in section and partly in a side view, in an enlarged representation the piston unit of the inventive device.

In the following, a working cycle of the pneumatic device A shown completely in FIG. 4 will be explained.

1. The piston 9 and thus the suction holder 3 are moved upwardly by supplying the underside of the piston 9 with compressed air supplied via the air connector 10, while, advantageously, at the same time a vacuum is supplied to the upper air connector 11 at the upper side of the piston.

2. Before the piston 9 reaches its uppermost position, a compressed air pulse is supplied via the upper air connector 11 to the upper side of the piston which acts as a braking air pulse for improving the braking action of the pneumatically operating shock absorber 16.

3. The piston is subsequently secured in its upper position by cooperation of the permanent magnet 13 and the counter ring 14 whereby, at the same time, above the piston 9 a vacuum and below the piston 9 an excess pressure are provided.

4. In this upper rest position of the piston, and thus of the suction holder 3, an adhesive label 4 is supplied by the transfer element 5 to the underside of the suction holder 3 whereby the ball 17 functioning as a check valve prevents the adhesive label from being blown away by the excess pressure provided within the interior of the hollow piston rod 7.

5. The lifting magnet 19 is then actuated in order to slightly lower the actuating rod 19.1 and the actuating fork 19.2, and thus also the piston rod 7 together with the suction holder 3 by the support ring 20, for bridging the distance indicated in FIG. 2 by the line a, whereby, at the same time, to the upper side of the piston for a short period of time compressed air is supplied in order to release the permanent magnet 13 reliably from the ring 14 consisting of ferromagnetic material, whereby, additionally vacuum is applied to the underside of the piston and travels through the hollow piston rod 7 and the axial bore 3.1 to the underside of the suction holder 3 in order to secure the label by suction. At the same time, the vacuum supply to the suction arms 5.2 and 5.3 of the transfer element 5 is interrupted in order to release the label from its transfer element that is then returned into its initial position for receiving the next label.

6. The upper side of the piston 9 is then loaded through the air connector 11 with vacuum. This vacuum also acts onto the piston of the shock absorber 16. Together with the vacuum still acting onto the underside of the piston, the sum of all forces is directed such that the piston of the shock absorber 16 and its piston rod 15 together with the piston 9, the piston rod 7, and the suction holder 3 are moved downwardly by the maximum possible travel stroke of the shock absorber piston where they will remain for a short period of time. In this position, a rotary joint 22 can rotate the suction holder 3, including the piston rod, into the direction of double arrow f2 in order to orient the label secured by the suction holder into a desired transfer position.

7. Via the upper air connector 11 the upper side of the piston is now supplied with compressed air in order to have the piston and thus the holder perform the pressing stroke in the downward direction whereby the lower air connector 10 to the vacuum source is still in communication.

8. In order to move the suction holder 3 upwardly, after it has been lowered onto the packaged goods and the adhesive label 4 has adhered to the packaged goods, compressed air is supplied via the lower air connector 10 even before the packaged goods has been reached in order to counteract inertia, so that, on the one hand, the compressed air stream supplied through the piston rod and the axial bore 3.1 will release the label from the underside of the holder and move the ball 17 onto its seating surface while, on the other hand, the lifting stroke of the piston 9 is started, supported by the vacuum acting onto the upper side of the piston via the air connector 11. The bypass within the ball seating surface of the ball 17 prevents that the suction holder will stick to the packaged goods which would result in an undesirable delay.

This step 8 corresponds substantially to the first step 1 so that now the working cycle is complete.

The aforedescribed system can operate, as disclosed, vertically in the upward and downward direction as well as horizontally.

Figure 6:
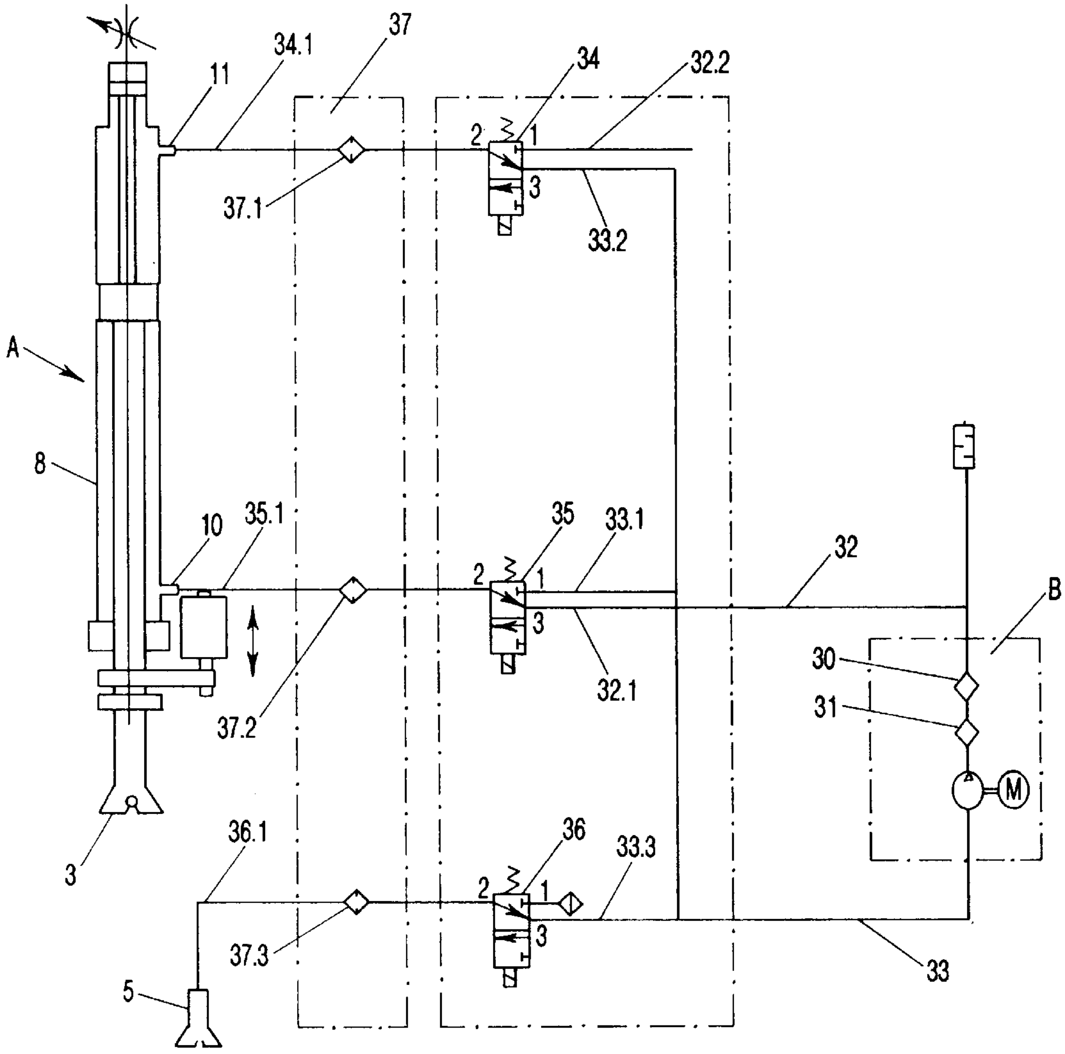
FIG. 6 shows in a schematic representation the pneumatic switching for supplying the inventive device with compressed air or vacuum.

FIG. 6 shows a schematic representation of the pneumatic cylinder 8 with the two air inlets 10 and 11 as well as the suction holder 3. The pneumatic transfer element 5 is also schematically represented.

An energy producing unit B comprises a drive motor M for driving the compressed air blower 30 and the vacuum blower 31. The compressed air blower 30 is connected via lines 32, 32.1 and 32.2 as well as two way valves 34, 35 and connecting lines 34.1 and 35.1 to the air connectors 11 and 10, respectively. The vacuum blower 31 is connected by lines 33, 33.1, and 33.2 as well as the two two way valves 34, 35 and the lines 34.1 and 35.1 to the air connectors 11 and 10, respectively. The vacuum blower 31 is connected by lines 33, 33.3, a further two way valve 36 and the further lines 36.1 to the transfer element 5. A filter block 37 with air filters 37.1, 37.2, and 37.3 is advantageously interposed in the further lines 34.1, 35.1, and 36.1.

Also, a program control for actuating the individual elements of the pneumatic control is provided in order to operate the working cycle according to steps 1 through 8.

The present invention is, of course, in no way restricted to the specific disclosure of the specification and drawings, but also encompasses any modifications within the scope of the appended claims.

We claim:

1. A device for attaching adhesive labels to packaged goods, comprising:

a compressed air source;

a vacuum source;

a pneumatic cylinder comprising air inlet openings, each opening alternatingly connected to either said compressed air source or said vacuum source by program-controlled two way valves;

a main piston connected to an upper end of a hollow piston rod and guided between an upper and a lower dead center position in said pneumatic cylinder;

said hollow piston rod having within said pneumatic cylinder a lateral air opening;

a suction holder connected to a lower end of said hollow rod positioned external to said pneumatic cylinder and having an upper position when said main piston is in said upper dead center position and a lower position when said main piston is in said lower dead center position;

said suction holder having a suction channel axially connectable to said hollow piston rod and closeable partially by a check valve relative said hollow piston rod, a pivotable label transfer unit having a label transfer position in which a respective label is positioned at a small distance below said suction holder positioned in said upper position;

a control device for lowering said suction holder into said lower position for receiving the label;

said control device comprising a control member that reciprocates vertically parallel to an axis of said pneumatic cylinder and cooperates with an abutment positioned external to said pneumatic cylinder at said piston rod or said suction holder;

said main piston having a permanent magnet connected to an upper surface thereof;

a counter ring consisting of ferromagnetic material connected to said pneumatic cylinder and positioned oppositely to said permanent magnet, when said main piston is in said upper dead center position;

a travel sensor arranged at an exterior side of said pneumatic cylinder for controlling a required stroke of said main piston.

2. A device according to claim 1, wherein said control device comprises a spring-loaded actuating rod controlled by a lifting magnet, a horizontally extending actuating fork connected to said actuating rod, wherein said actuating fork partially surrounds said piston rod above said abutment, wherein said abutment is a support ring.

3. A device according to claim 1, comprising a shock absorbing unit that dampens an upward movement of said main piston.

4. A device according to claim 3, wherein said shock absorbing unit comprises a pneumatic cylinder in which a shock absorber piston is guided having a piston rod portion that ends above said main piston.

* * * * *